(12) United States Patent
Richetti

(10) Patent No.: US 8,206,581 B2
(45) Date of Patent: Jun. 26, 2012

(54) HIGH EFFICIENCY REVERSE OSMOSIS SYSTEM

(75) Inventor: Thomas E. Richetti, Arroyo Grande, CA (US)

(73) Assignee: Thomas E. Richetti, Arroyo Grande, CA (US)

( * ) Notice: Subject to any disclaimer, the term of this patent is extended or adjusted under 35 U.S.C. 154(b) by 0 days.

(21) Appl. No.: 13/079,691

(22) Filed: Apr. 4, 2011

(65) Prior Publication Data

US 2011/0180465 A1    Jul. 28, 2011

Related U.S. Application Data

(60) Provisional application No. 61/341,781, filed on Apr. 5, 2010.

(51) Int. Cl.
*B01D 61/12* (2006.01)

(52) U.S. Cl. .............. 210/194; 210/137; 210/195.2; 210/257.2; 210/321.69

(58) Field of Classification Search .............. 210/108, 210/137, 143, 195.2, 195.3, 257.2, 258, 259, 210/321.65, 321.69, 652, 194; 366/341; 138/44
See application file for complete search history.

(56) References Cited

U.S. PATENT DOCUMENTS

| | | | |
|---|---|---|---|
| 3,493,496 A | 2/1970 | Bray et al. | |
| 4,176,063 A | 11/1979 | Tyler | |
| 4,482,456 A | 11/1984 | Grayson | |
| 4,705,625 A | 11/1987 | Hart | |
| 4,773,991 A * | 9/1988 | Aid | 210/96.2 |
| 5,006,234 A * | 4/1991 | Menon et al. | 210/98 |
| 5,132,017 A | 7/1992 | Birdsong et al. | |
| 5,232,591 A | 8/1993 | Solomon | |
| 5,282,972 A * | 2/1994 | Hanna et al. | 210/652 |
| 5,520,816 A * | 5/1996 | Kuepper | 210/649 |
| 5,647,973 A * | 7/1997 | Desaulniers | 210/96.2 |
| 6,001,244 A * | 12/1999 | Salter et al. | 210/104 |
| 6,110,360 A | 8/2000 | Hart | |
| 6,149,824 A * | 11/2000 | Chace et al. | 210/779 |
| 6,190,558 B1 * | 2/2001 | Robbins | 210/652 |
| 7,601,256 B2 * | 10/2009 | Beall | 210/116 |
| 7,763,171 B2 | 7/2010 | Beall | |

FOREIGN PATENT DOCUMENTS

GB        2228782    *  9/1990

OTHER PUBLICATIONS

"Drops of Energy, Conserving Urban Water in California to Reduce Greenhouse Gas Emissions," Elkind,Ethan N., et al. May 2011.

* cited by examiner

*Primary Examiner* — Joseph Drodge
(74) *Attorney, Agent, or Firm* — SoCal IP Law Group LLP; Mark A. Goldstein

(57) ABSTRACT

A high efficiency reverse osmosis system which utilizes a tuned injector in fluidic communication with a reverse osmosis membrane. The tuned injector includes an injector housing, an injector nozzle, a mixing chamber and an injector throat. The tuned injector utilizes line hydrostatic pressure to inject raw water with an injector nozzle into the mixing chamber to mix with recirculated concentrate water drawn into the mixing chamber by venturi effect and hydrostatic pressure to form feed water. The feed water is then discharged through the injector throat across a reverse osmosis membrane to produce permeate water using the line hydrostatic pressure.

17 Claims, 5 Drawing Sheets

HIGH EFFICIENCY REVERSE OSMOSIS SYSTEM

CROSS-REFERENCE TO RELATED APPLICATIONS

This application is a non-provisional application which takes benefit and priority under 35 U.S.C. §119(e) from co-pending U.S. provisional application Ser. No. 61/341,781 filed, Apr. 5, 2010 to the instant inventor. The aforementioned provisional patent application is hereby incorporated by reference as if fully set forth herein.

FEDERALLY SPONSORED RESEARCH AND DEVELOPMENT

Not Applicable

COPYRIGHT NOTICE

Not Applicable

RELEVANT FIELD

This application is directed generally toward water treatment and more specifically toward a high efficiency reverse osmosis system.

RELEVANT ART OVERVIEW

Reverse osmosis systems have been used for purifying drinking water in consumer and commercial applications for some years. The smaller reverse osmosis systems that do not utilize a pressure booster pump and recirculation valve require four to five gallons of raw water flowing across the membrane surface to produce one gallon of permeate water for approximately 20% recovery rate. This water flow across the membrane surface is required to prevent the reverse osmosis membrane from fouling. The 20% recovery rate on these smaller reverse osmosis systems is typically achieved utilizing an atmospheric storage tank that does not provide any back pressure on the permeate water discharge line, thus requiring 5 gallons of feed water to receive 1 gallon of permeate water. The remaining 4 gallons of water called concentrate water is usually discharged to a wastewater drain which wastes otherwise useful water.

In other circumstances, pressurized storage tanks on reverse osmosis systems are utilized in under-the-counter and light commercial installations. These pressurized storage tanks have a pre-charged air bladder under 6-8 PSIG pressure which is compressed as permeate water is produced and stored in the pressurized storage tank. The compressed air bladder provides back pressure on the reverse osmosis membrane which increases as the pressurized storage tank fills, thus adversely affecting the efficiency of the membrane recovery rate. Once the backpressure reaches a certain point, permeate water production stops.

Alternately, larger commercial reverse osmosis systems use electrically powered pressure booster pumps to improve water recovery efficiency. The booster pumps force water through the reverse osmosis membrane at high pressure, making it possible to recirculate concentrate water generated by the reverse osmosis membrane back through the suction side of the booster pump and again applied across the reverse osmosis membrane.

In order to maintain a typical 5:1 flow across the reverse osmosis membrane specified by membrane manufacturers and obtain at least 50% recovery of water used, the reverse osmosis system must recirculate 3 gallons of concentrate water back to the suction side of the booster pump which is then mixed with 2 gallons of raw water to produce 1 gallon of permeate water. Commercial reverse osmosis systems demand significant quantities of electrical energy in order to power booster pumps and/or other auxiliary systems to deliver the permeate water to service.

Lastly, there is growing pressure to replace salt regenerative water softeners in areas where acceptable waste stream concentrations of sodium, chloride and increased total dissolved solids are being lowered by wastewater treatment plants in order to meet regulatory requirements and/or for irrigation purposes. The result is that many municipalities are considering banning automatic salt regenerating water softeners to meet new regulatory requirements. Replacement of salt regenerative water softeners is limited to periodic ion exchange tank replacement or installation of reverse osmosis systems, neither of which is efficient in the use of increasingly scarce sources of useable fresh water. Reverse osmosis systems require electrical power and exchange tanks require delivery by motor vehicle which requires fossil fuel. Other types of treatment systems introduce sodium, chloride and increased total dissolved solids into the waste stream.

SUMMARY

In view of the foregoing, various exemplary embodiments of a high efficiency reverse osmosis system are described herein. The improvements to traditional reverse osmosis systems described in the various inventive embodiments which follow allow for permeate water production efficiencies of 40% to 70% or greater recovery, without requiring energy intensive pressure booster pumps, thus providing both energy and potable water savings. In addition, the various exemplary embodiments of a high efficiency reverse osmosis system described herein do not discharge significant quantities of sodium chloride, thus wastewater discharge is suitable for direct discharge into sewer systems and/or for use in irrigation.

For purposes of this specification, a tuned injector is defined as a device configured to provide manufacturer prescribed water flows across a reverse osmosis membrane in order to obtain a permeate water production in a range of 4:1-5:1 or higher without significant loss of initial hydrostatic system pressure. Significant loss of initial hydrostatic system pressure being defined as greater than a 15% drop in the initial hydrostatic system pressure.

In one exemplary embodiment, the high efficiency reverse osmosis system comprises a tuned injector in fluidic communication with a reverse osmosis membrane. In an exemplary embodiment, the tuned injector includes an injector housing, an injector nozzle, a mixing chamber and an injector throat. A first inlet is provided for receiving raw water supplied at an initial hydrostatic system pressure to the injector nozzle. The injector nozzle includes an axial bore having a first fluid flow cross sectional area. For typical household applications, the initial hydrostatic system pressure is generally in a range of about 50-100 psig. Higher pressures may be utilized in industrial applications. The tuned injector is configured to maintain hydrostatic pressure applied to the reverse osmosis membrane within 15% of the initial hydrostatic system pressure in dependence on the flow requirements of the reverse osmosis membrane and a defined permeate water production rate.

A second inlet is provided for supplying recirculated concentrate water generated by the reverse osmosis membrane to the mixing chamber. In an exemplary embodiment, the mixing chamber is disposed intermediate the injector nozzle and the injector throat within the injector housing. Recirculated concentrate water is fed through the second inlet and mixed with raw water introduced into the mixing chamber by the injector nozzle. The recirculated concentrate water is fed though the second inlet solely by the initial hydrostatic system pressure which eliminates the need for a recirculation or booster pump.

The injector throat is provided for applying feed water formed in the mixing chamber from the mixture of raw water and concentrate water in a defined mixing ratio of approximately 3 parts recirculated concentrate water to 2 parts raw water across the reverse osmosis membrane. The injector throat includes an axial bore having a second fluid flow cross sectional area approximately twice that of the first fluid flow cross sectional area. One skilled in the art will appreciate that the other mixing ratios may be utilized to accommodate improvements in reverse osmosis membrane technologies.

In various exemplary embodiments, the injector nozzle and the injector throat may be axially aligned along a common longitudinal centerline within the injector housing. The mixing chamber may be disposed at a non-parallel angle to the common longitudinal centerline within the injector housing. Alternately, or in addition therewith, the tuned injector may be provided in a separate injector housing or made integral with a housing containing the reverse osmosis membrane. Lastly, an electromechanical logic circuit may be included to perform any of sequentially storing permeate water in a plurality of permeate water storage tanks, flushing of the reverse osmosis membrane when permeate water demand is not present and/or minimizing sporadic feed water flows through the reverse osmosis membrane.

BRIEF DESCRIPTION OF DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments described herein and as is defined by the claims.

DETAILED DESCRIPTION

Various exemplary embodiments of a high efficiency reverse osmosis system are disclosed herein. In the following detailed description, numerous specific details are set forth in order to provide a thorough understanding of the present inventive embodiments. It will be apparent, however, to one skilled in the art that the present inventive embodiments may be practiced without these specific details. In other instances, well-known structures, devices or components may be shown in block diagram form in order to avoid unnecessarily obscuring the present inventive embodiments disclosed herein.

Figure 1:
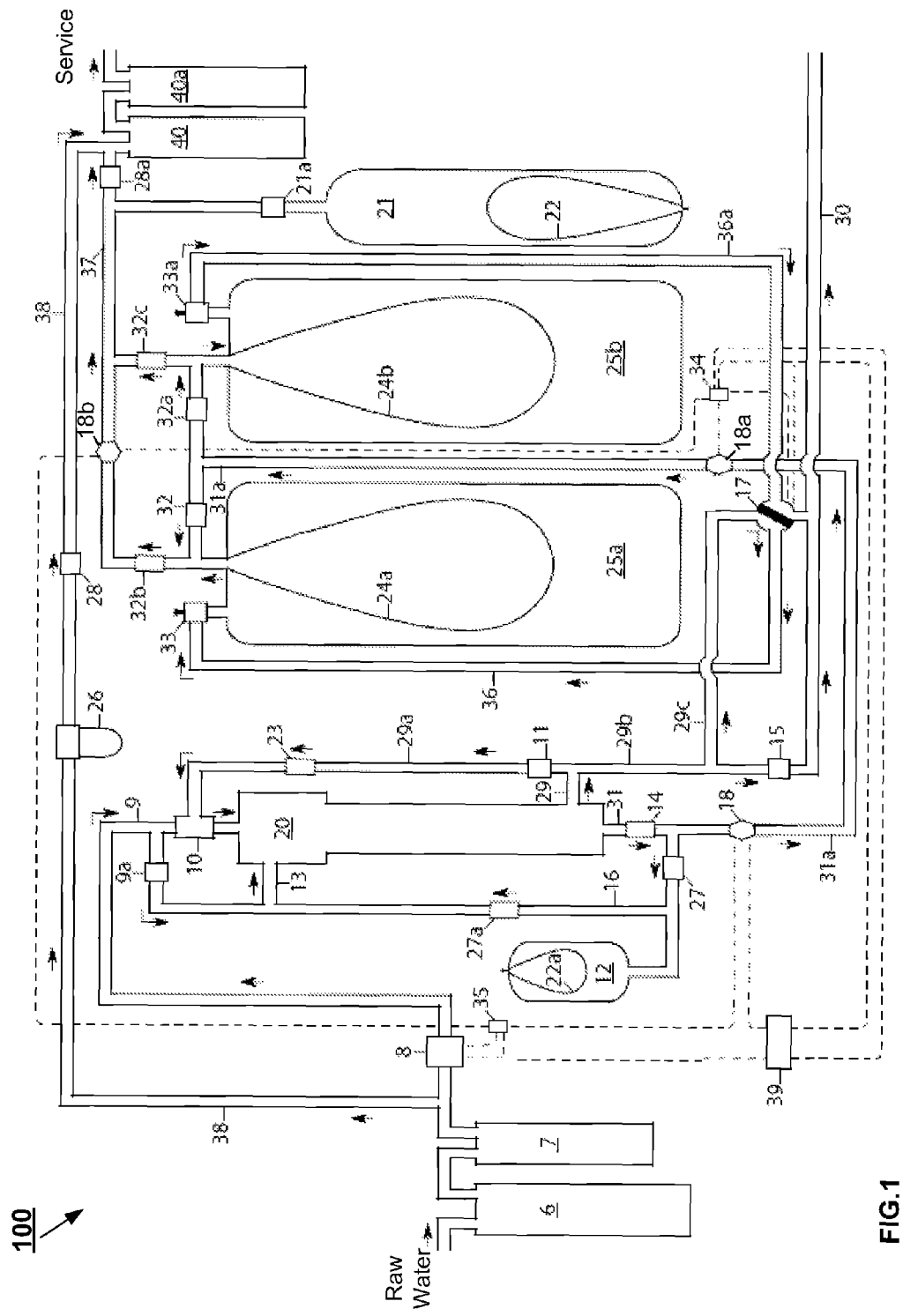
FIG. 1—depicts a first block diagram of a high efficiency reverse osmosis system in accordance with an exemplary embodiment.

Referring to FIG. 1, a first block diagram of a high efficiency reverse osmosis system 100 in accordance with an exemplary embodiment is depicted. In this exemplary embodiment, the high efficiency reverse osmosis system 100 utilizes twin-alternating water-on-water storage tanks 25a, 25b for storage and delivery. Permeate water is delivered to service by concentrate water hydrostatic system pressure applied to permeate bladders 24a, 24b installed inside the water-on-water storage tanks 25a, 25b. Raw water flows to reverse osmosis unit 20 via tuned injector 10 and bypass line 13 that allows raw water to enter the inlet end of reverse osmosis unit 20, when the initial hydrostatic system pressure drops to a set level. Raw water fed through bypass line 13 is intended to purge any excessive concentrate build up from the inlet side of reverse osmosis membrane 51 (FIG. 4), each time water flows to service at a set flow rate. This improves reverse osmosis membrane life and also provides additional concentrate water flow to water-on-water storage tanks 25a, 25b to meet service flow rate demands.

Twin water-on-water storage tanks 25a, 25b may be connected with 4-way valve 17 or two 3-way valves (not shown) that has one water-on-water tank 25a or 25b providing permeate water to service, while the alternate water-on-water tank 25a or 25b is capable of receiving permeate water from reverse osmosis unit 20. When the receiving water-on-water tank 25a or 25b is filled to capacity with permeate water, pressure on the permeate lines 31, 31a increases to a preset pressure and activates pressure switch 18a. Pressure switch 18a in turn activates latching relay 34 that aligns the 4-way valve 17 to alternate or sequence water-on-water tank 25a or 25b so that permeate water can be received by the water-on-water tank 25a or 25b taken out of service, even if partially empty.

Figure 4:
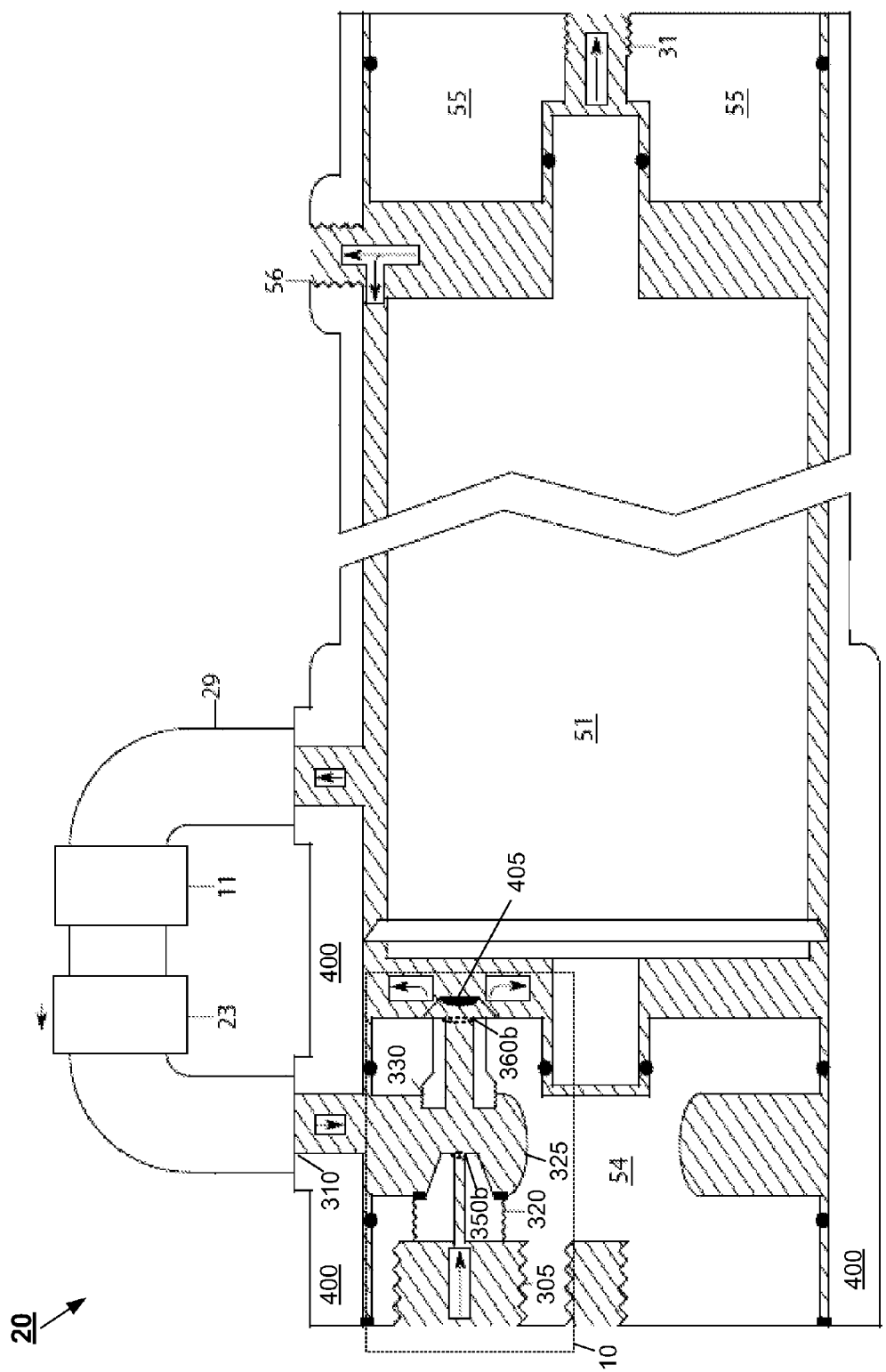
FIG. 4—depicts a cross sectional view of a tuned injector integrated into a housing of a reverse osmosis housing in accordance with an exemplary embodiment.

This allows concentrate water in the depressurized water-on-water tank 25a or 25b to flow to drain outlet line 30, allowing permeate water to fill permeate water bladder 24a or 24b in the depressurized water-on-water tank 25a or 25b without added back pressure to reverse osmosis membrane 51 (FIG. 4). Pressure switch 18a is used for alternating or sequencing the water-on-water tank 25a or 25b via latching relay 34 located in the located in permeate line 31a before water-on-water tank check valves 32, 32a.

If both water-on-water storage tanks 25a, 25b are filled and no permeate water demand is present, pressure continues to rise in permeate water line 31a which allows membrane flush tank 12 to fill with permeate water. Filling of membrane flush tank 12 with permeate water pressurizes air bladder 22 to a preset pressure. This preset pressure closes pressure switch 18 which causes inlet valve 8 to close, thus shutting off raw water flow to reverse osmosis unit 20.

Upon shutting down of raw water flow to reverse osmosis unit 20, permeate water in membrane flush tank 12 is released to the inlet end of reverse osmosis unit 20, and flushes concentrate water in the reverse osmosis membrane 51 (FIG. 4) into drain line 30. Flushing concentrate water from the reverse osmosis membrane 51 (FIG. 4) controls total dissolved solids (TDS) creep which helps to extend the life of reverse osmosis membrane 51 (FIG. 4) and facilitates achieving a 40% to 70% or greater water recovery. Inlet TDS is a factor on how much recovery is possible; the lower the inlet TDS, the higher the recovery rate. In order to prevent TDS creep, it is important that reverse osmosis system 100 stay in production, without sporadically starting and stopping every time permeate water demanded.

When reverse osmosis system 100 is in shutdown mode and demand for permeate water occurs, permeate water flows from permeate buffer tank 21 to provide permeate water to service. Reverse osmosis system 100 will not turn on again until a preset pressure drop in the service line is reached which prevents frequent on/off cycles. Permeate buffer tank 21 is located on the permeate/service line downstream from twin water-on-water storage tanks 25a, 25b tanks and includes air bladder 22 for pressurization. Permeate water backflow is prevented by isolation valve 21a and check valve 28a. Water-on-water storage tanks 25a, 25b, when pressurized, will refill permeate buffer tank 21 as it is delivering permeate water under pressure to service. The permeate feed and discharge lines to the water-on-water storage tanks 25a, 25b tanks are equipped with check valves 32, 32a, 32b, 32c to prevent water from crossing over between water-on-water storage tanks 25a, 25b. This assures water-on-water storage tanks 25a, 25b deliver permeate water independently. Twin water-on-water storage tanks 25a, 25b are controlled and operated by two latching relays 34, 35 that receive signals from the three pressure switches 18, 18a, 18b.

Pressure switches 18, 18a, 18b control the inlet valve 8 and the 4-way valve 17 and form an electromechanical logic circuit which is not reliant on microprocessor or microcontroller programming. Pressure switches 18, 18a, 18b control inlet valve 8 and the 4-way valve 17 may be powered with a low voltage power supply, for example, a 12 volt direct current (DC) battery 39. In remote locations, DC battery 39 may be charged using a solar panel (not shown.)

After the permeate water flush is complete, pressure in permeate lines 31, 31a located upstream of check valves 32, 32a and before water-on-water storage tanks 25a, 25b, falls to near 0 PSIG. This drop in pressure resets pressure switch 18a for alternating or sequencing twin water-on-water storage tanks 25a, 25b and also resets pressure switch 18 by de-energizing latching relay 35. De-energizing of latching relay 35 allows inlet valve 8 to open when latching relay 35 is re-energized upon a pressure signal from pressure switch 18b.

Figure 1A:
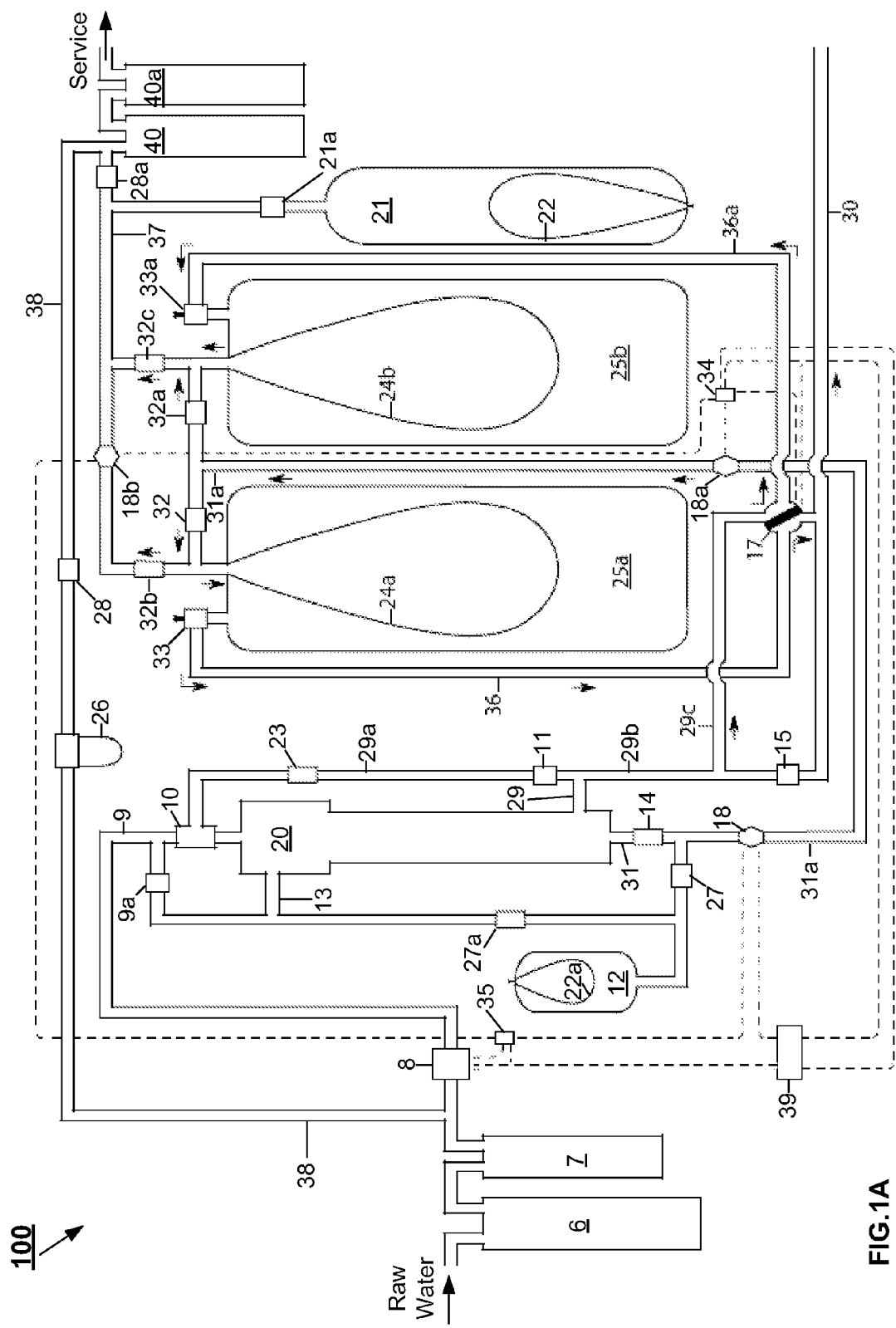
FIG. 1A—depicts a second block diagram of a high efficiency reverse osmosis system in accordance with an exemplary embodiment.

Referring to FIG. 1A, an exemplary second block diagram of a high efficiency reverse osmosis system 100 is depicted. In this exemplary embodiment, a flow path description assumes water-on-water storage tank 24b is aligned to receive permeate water from reverse osmosis unit 20. In this exemplary embodiment, raw water to be treated enters pre-filter 6 where chlorine and sediment are removed by carbon and other activated media. Raw water then flows through filter 7 that adds an anti-scalant to the raw water. Raw water then flows through inlet valve 8 through raw water line 9 and into a tuned injector 10. Raw water flowing through tuned injector 10 creates suction on the concentrate water return line 29a which draws concentrate water into tuned injector 10 where it is mixed with raw water in a defined relationship of about 3 parts concentrate water to 2 parts of raw water to form feed water.

Feed water is then discharged from tuned injector into reverse osmosis unit 20 where permeate water is produced and exits reverse osmosis unit 20 through line 31 continues through check valve 14 and past pressure switches 18, 18a installed in line 31a, through check valve 32a and then enters permeate bladder 24b of water-on-water storage tank 25b aligned in refill mode. The expanding permeate bladder 24b pushes concentrate water in water-on-water storage tank 25b, past air eliminator valve 33a, into line 36a, through 4-way valve 17 and into drain line 30.

Concentrate water exits reverse osmosis unit 20 through line 29, and into line 29a. Concentrate water flows through flow meter 11 and check valve 23 before reentering tuned injector 10. Concentrate water entering line 29b, flows into line 29c and through 4-way valve 17, past air eliminator valve 33, then into water-on-water storage tank 25a. Concentrate water flowing into water-on-water storage tank 25a compresses permeate bladder 24a which forces permeate water past check valve 32b, pressure switch 18b, and check valve 28a through optional filters 40 and 40a to service.

Check valves 32, 32a, 32b and 32c prevent permeate water from crossing over between water-on-water storage tanks 25a, 25b. When inlet valve 8 is open and permeate water is being produced and sent to line 31 and on to permeate bladder 24b, water-on-water storage tank 25b is depressurized. Permeate bladder 24b continues to expand as permeate water is received, until full. When permeate bladder 24b cannot receive additional permeate water, pressure in line 31a rises to a preset level that triggers pressure switch 18a to signal latching relay 34 which causes 4-way valve 17 to alternate or sequence to water-on-water storage tank 25a.

Alternately, if both permeate bladders 24a, 24b in water-on-water storage tanks 25a, 25b are completely filled with permeate water, pressure in line 31a increases, adding permeate water to membrane flush tank 12, until reaching a preset level to trip pressure switch 18 which activates latching relay 35. Activation of latching relay 35 causes inlet valve 8 to close. When inlet valve 8 is closed, pressure in reverse osmosis unit 20 drops as the flow control valve 15 continues to discharge concentrate water into drain line 30. The drop in pressure within reverse osmosis unit 20 causes permeate water in membrane flush tank 12 to discharge permeate water from the permeate bladder 22a into the reverse osmosis unit 20 via line 13. The discharge of permeate water into the reverse osmosis unit 20 flushes concentrate water from the inlet side of the reverse osmosis membrane 51 (FIG. 4) in the reverse osmosis unit 20 into line 29, through line 29b and flow control valve 15 into drain line 30.

Pressurized permeate water in line 31a flows through check valves 27, 27a, which relieves pressure in line 31a. The drop in pressure resets pressure switches 18, 18a. Assuming inlet valve 8 is closed, no pressure is applied to water-on-water storage tank 25a. However, permeate buffer tank 21 with air bladder 22 remains charged at full hydrostatic line pressure for meeting permeate water demand. When demand for permeate water is sensed by a drop in pressure, permeate water is released from permeate buffer tank 21, past check valve 28a and through optional filters 40, 40a to service line. Permeate water is delivered from permeate buffer tank 21 through manual isolation valve 21a until the drop in pressure in line 37 falls to a preset level, which triggers pressure switch 18b to cause latching relay 35 to open inlet valve 8.

When permeate water flow demand is at a higher flow rate than can be delivered by raw water and concentrate water passing through tuned injector 10, pressure drops in reverse osmosis unit 20, causing flow regulator 9a to bypass raw water around tuned injector 10 which increases flow rate of concentrate water through reverse osmosis unit 20 and into water-on-water storage tank 25a, thus increasing the flow of permeate water to service. When permeate water is depleted from permeate bladder 24a and 24b, pressure drops to a preset level in line 38, pressure regulator valve 26, bypasses filtered water to service through check valve 28, and into optional filters 40, 40a.

Concentrate water then flows from line 29c through valve 4-way valve 17 into line 36a, and then into water-on-water storage tank 25b to provide sufficient pressure to deliver permeate water in permeate bladder 24b to service. As permeate water fills permeate bladder 24a, concentrate water is pushed out of water-on-water storage tank 25a into line 36 through 4-way valve 17 into drain line 30.

Figure 2:
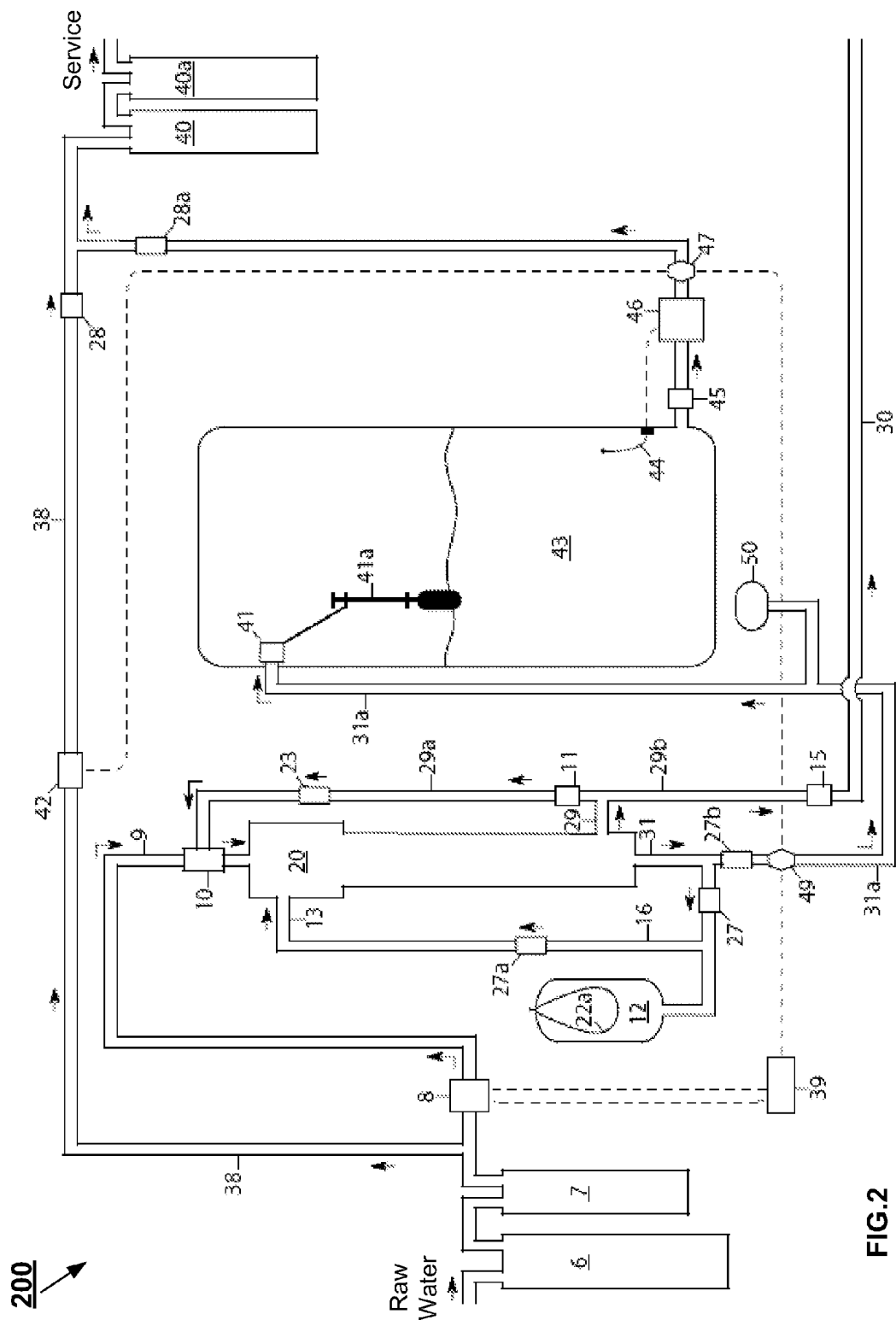
FIG. 2—depicts a third block diagram of a high efficiency reverse osmosis system in accordance with alternate exemplary embodiment.

Referring to FIG. 2, an exemplary third block diagram of a high efficiency reverse osmosis 200 system is depicted. In this exemplary embodiment, high efficiency reverse osmosis 200 may utilize a standard atmospheric storage tank 43. Atmospheric storage tank 43 includes mechanical float valve 41 and adjustable float assembly 41a to produce up to 70% or more water recovery. When mechanical float valve 41 in the atmospheric storage tank 43 closes, reverse osmosis unit 20 continues to produce permeate water that fills membrane flush tank 12 for flushing of reverse osmosis membrane 51 (FIG. 4). When a preset pressure is reached in permeate line 31a, pressure switch 49 is activated and closes inlet valve 8. In this exemplary embodiment, high efficiency reverse osmosis 200 system may utilize an on-demand delivery pump 46 to deliver permeate water to service.

In this exemplary embodiment, as permeate water level drops in atmospheric storage tank 43 due to demand flow, adjustable float assembly 41a drops to a preset level which allows mechanical float valve 41 to open. The opening of mechanical float valve 41 relieves pressure in permeate line 31a, resets pressure switch 49 and causes inlet valve 8 to open restoring raw water flow to reverse osmosis unit 20. Production of permeate water resumes when the level of permeate water falls to a preset level within atmospheric storage tank 43 causing low-water level float switch 44 to open and shutting off on-demand delivery pump 46. The drop in pressure on the discharge side of on-demand delivery pump 46 is sensed by pressure switch 47 which cause bypass valve 42 to open, allowing raw water flow through optional filters 40, 40a to service.

In this exemplary embodiment, raw water is pretreated using filters 6, 7 routed through inlet valve 8 into a first inlet of tuned injector 10. Concentrate water is recirculated via lines 29, 29a through flow meter 11 and check valve 23 into a second inlet of tuned injector 10 where raw water and recirculated concentrate water are mixed in a defined ratio of approximately three parts concentrate water to two parts raw water and discharged into reverse osmosis unit 20. A portion of concentrate water exiting line 29 flows through line 29b and control valve 15 into drain line 30. Permeate water is fed into line 31, passes through check valve 27 and into membrane flush tank 12.

Permeate water also continues to flow in line 31 through check valve 27b and past pressure switch 49 through mechanical float valve 41. When mechanical float valve 41 is closed, pressure in permeate line 31a increases adding permeate water to buffer tank 50 and membrane flush tank 12. When pressure reaches a preset level in line 31a, pressure switch 49 closes and causes inlet valve 8 to close. With inlet valve 8 is closed, pressure in line 29b is relieved through flow control valve 15 into drain line 30. Air pressure in bladder 22a forces permeate water out of membrane flush tank 12, through check valve 27a and into the inlet side of reverse osmosis unit 20. The flow of permeate water flushes concentrate water from the reverse osmosis unit 20, through line 29 into line 29b and through flow control valve 15 into drain line 30 as previously described above with respect to the discussion accompanying FIG. 1.

Buffer tank 50 maintains pressure on pressure switch 49 in conjunction with check valve 27b. When permeate water level drops in atmospheric storage tank 43 sufficiently to open mechanical float valve 41, with float assembly 41a, pressure in line 31a is relieved and opens pressure switch 49. Upon opening of pressure switch 49, a signal is sent to inlet valve 8 to open.

In an exemplary embodiment where sufficient gravity feed flow is unavailable, delivery pump 46 may supply permeate water to service by discharging water through manual stop valve 45 and pumping water past pressure switch 47 and check valve 28a to line 38 and on through optional filters 40 and 40a to service. Check valve 28 prevents back flow in line 38. Low-water level float switch 44 turns off on-demand delivery pump 46 when permeate water levels drop to a preset amount in atmospheric storage tank 43. This drop in permeate water pressure closes pressure switch 47 which signals bypass valve 42 in line 38 to open.

Low voltage power supply 39 supplies power to pressure switches 47 and 49 and to inlet valve 8 and bypass valve 42. Low voltage power supply 39 may be a 12 VDC battery with or without solar charging capabilities. In an exemplary embodiment, on-demand delivery pump 46 may also be powered from an alternating current source, low voltage power supply 39 or otherwise adapted to operate from low voltage power supply 39.

Figure 3:
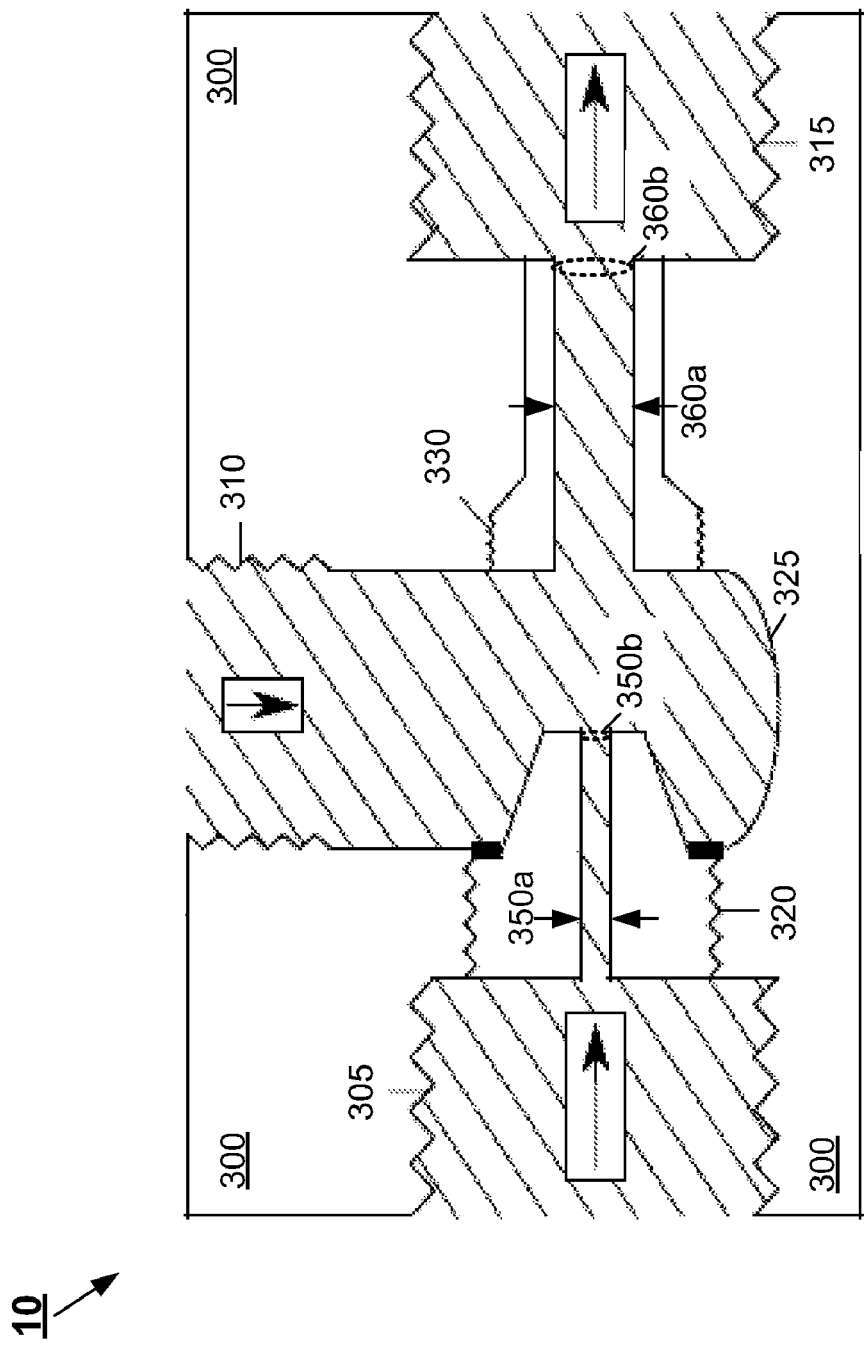
FIG. 3—depicts a cross sectional view of a tuned injector in accordance with an exemplary embodiment.

Referring to FIG. 3, an exemplary cross sectional view of a tuned injector 10 is depicted. In this exemplary embodiment, tuned injector 10 includes a housing 300, a first inlet 305 for receiving raw water to be treated by reverse osmosis membrane 51 (FIG. 4), a second inlet 310 for receiving recirculated concentrate water generated by reverse osmosis membrane 51 and an outlet 315 for injecting feed water formed from a mixture of raw water and recirculated concentrate water across reverse osmosis membrane 51. Raw water received through first inlet 305 passes through an injector nozzle 320. Injector nozzle 320 includes an axial bore 350a having a defined cross-sectional area 350b. In an exemplary embodiment, injector nozzle 320 may be threaded into an inlet section of the housing 300 to allow for inspection, cleaning and/or replacement. Injector nozzle 320 may project into a mixing chamber 325 formed in the housing 300.

Mixing chamber 325 is volumetrically dimensioned to receive and mix defined quantities of raw water and recirculated concentrate water flowing through tuned injector 10. An outlet section of tuned injector 10 includes an injector throat 330 in fluidic communication with mixing chamber 325. Injector throat 330 includes an axial bore 360a having a defined cross-sectional area 360b. Cross-sectional area 360b of injector throat's axial bore 360a is approximately twice that of injector nozzles' axial bore 350b. In an exemplary embodiment, injector throat 330 may be threaded into an outlet section of housing 300 to allow for inspection, cleaning and/or replacement.

The specific dimensions of axial bores 350b, 360b and mixing chamber 325 are dependent on flow requirements of reverse osmosis membrane 51 and permeate water production rate. However, in general, axial bores 350b, 360b and mixing chamber 325 of tuned injector 10 are dimensioned to mix 3 parts recirculated concentrate water with 2 parts of raw water to generate one part of permeate water from the reverse osmosis membrane 51 in a standard manufacturer's prescribed 5:1 permeate production ratio.

In an exemplary embodiment one or more of inlets 305, 310 and/or outlet 315 may be threaded to accommodate common pipe fittings. For example, common ¾" or 1" pipe fitting and piping may be used in typical residential and small commercial installations. Alignment of injector nozzle 320 and injector throat 330 is generally along a common longitudinal centerline with the injector nozzle bore 350a and injector throat bore 360a within tuned injector housing 300.

Tuned injector housing 300 may be constructed using injection molded plastic, for example, polyvinyl chloride (PVC) or acrylonitrile butadiene styrene (ABS). Alternately, tuned injector housing 300 may be milled or cast from a corrosion resistant metal, for example stainless steel or lead free brass. Injector nozzle 320 and injector throat 330 may be obtained from commercial plumbing supply houses and axially bored where necessary to achieve an approximate 2:1 injector throat cross-sectional area 360b to injector nozzle cross-sectional area 350b.

The various inlet 305, 310, outlet 315, mixing chamber and fixtures for maintaining the injector nozzle 320 and injector throat 330 may be bored and/or threaded using common machining methods known in the relevant art.

During operation, raw water enters into inlet 305, and flows through injector nozzle 320 into mixing chamber 325. A small pressure drop produced by venturi effect of raw water flowing through injector nozzle 320 into mixing chamber 325 causes concentrate water to be pulled into mixing chamber 325 and blended with raw water in an approximate 3:2 ratio. Differences in cross sectional area bores 350b, 360b effectively recycles 3 parts of concentrate water for every 2 parts of raw water, thus producing a recovery efficiency of at least 50%. The blended raw and concentrate water are then discharged through injector throat 330 into reverse osmosis unit 20 (FIG. 1, 1A or 2).

Referring to FIG. 4, an exemplary cross sectional view of a tuned injector 10 integrated into a housing of reverse osmosis unit 20 is depicted. In this exemplary embodiment, reverse osmosis unit 20 includes a membrane housing 400, an inlet cap 54 and an outlet end cap 55. Tuned injector 10 is integrated into inlet cap 54 which reduces the length of piping required and possible hydrostatic pressure losses across fittings and flow induced friction.

Concentrate water recirculation line 29, flow meter 11 and check valve 23 are mounted directly to membrane housing 400. The structure and function of tuned injector 10 are substantially similar to the inventive embodiment provided in the discussion accompanying FIG. 3 above and for brevity is not repeated here. In an exemplary embodiment, feed water flow director 405 may be provided at the discharge end of injector throat 330. Feed water flow director 405 assists in laterally directing feed water so that feed water is uniformly distributed across a face of the reverse osmosis membrane 51 rather than impinging directly upon a small area of reverse osmosis membrane 51.

The various exemplary inventive embodiments described herein are intended to be merely illustrative of the principles underlying the inventive concept. It is therefore contemplated that various modifications of the disclosed embodiments will without departing from the inventive spirit and scope be apparent to persons having ordinary skill in the art. They are not intended to limit the various exemplary inventive embodiments to any precise form described. In particular, the various flow arrangements, valve placement and electromechanical control logic circuit may be different than that described herein. No specific limitation is intended to the operating sequences or construction materials described herein. Other variations and inventive embodiments are possible in light of the above teachings, and it is not intended that the inventive scope be limited by this specification, but rather by the Claims following herein.

What is claimed:

1. A high efficiency reverse osmosis system comprising:
    a tuned injector in fluid communication with a reverse osmosis membrane, including an injector housing, an injector nozzle, a mixing chamber and an injector throat; each of the nozzle and throat being separately insertable into an inlet and an outlet, respectively, of the interior housing;
    the injector housing including a first inlet to receive means for receiving a quantity of raw water supplied at an initial hydrostatic system pressure;
    the tuned injector to recirculate concentrate water received from a reverse osmosis membrane through a second inlet in the injector housing, opening into the mixing chamber utilizing only the initial hydrostatic system pressure, without the assistance of a pump or other pressure creating device;
    the tuned injector to blend in the mixing chamber the raw water and concentrate water in a defined mixing ratio to form a quantity of feed water in dependence on flow requirements of the reverse osmosis membrane and a permeate water production rate, wherein the defined mixing ratio is approximately three parts concentrate water to two parts raw water with one part discharged to waste, and one part permeate production from the reverse osmosis membrane outlet causing a five part concentrate to one part permeate flow within the reverse osmosis membrane as required to maintain the reverse osmosis membrane with 50% recovery of total water consumed;
    the injector throat to provide feed water from the mixing chamber to the reverse osmosis membrane without substantial reduction in the initial hydrostatic system pressure.

2. The system of claim 1 wherein the injector nozzle and the injector throat are axially aligned along a common longitudinal centerline.

3. The system of claim 1 wherein the mixing chamber is disposed intermediate of the injector nozzle and the injector throat.

4. The system of claim 1 wherein the injector nozzle includes a first aperture having a first cross sectional area and the injector throat includes a second aperture having a second cross sectional area approximately twice that of the first cross sectional area.

5. The system of claim 1 wherein a volume of the mixing chamber is dimensioned to maintain the defined mixing ratio without substantial reduction in the initial hydrostatic system pressure.

6. The system of claim 1 further including electromechanical logic configured to control the system including signaling the system to perform at least one of:
    sequentially storing permeate water in a plurality of permeate water storage tanks;
    flushing the reverse osmosis membrane when permeate water demand is not present;
    minimizing sporadic feed water flows through the reverse osmosis membrane.

7. A high efficiency reverse osmosis system comprising:
    a tuned injector in fluidic communication with a reverse osmosis membrane, the tuned injector comprising:
    a first inlet to receive raw water supplied at an initial hydrostatic system pressure and to provide the raw water to a mixing chamber through an injector nozzle;
    a second inlet to receive recirculated concentrate water generated by the reverse osmosis membrane opening into the mixing chamber, the recirculated concentrate water fed to the second inlet by the hydrostatic system pressure, without the assistance of a pump or other pressure creating device between the reverse osmosis membrane and the tuned injector;

an injector throat to discharge feed water formed from a mixture of raw water and concentrate water from the mixing chamber in a defined mixing ratio to the reverse osmosis membrane, wherein the defined mixing ratio is approximately three parts concentrate water to two parts raw water, and each of the nozzle and throat being separately insertable into the first inlet and an outlet, respectively, of the injector housing.

8. The system of claim 7 wherein the injector nozzle includes a first aperture having a first cross-sectional area axially disposed therethrough.

9. The system of claim 8 wherein the injector throat includes a second aperture having a second cross-sectional area axially disposed therethrough, the second cross-sectional area being approximately twice that of the first cross-sectional area.

10. The system of claim 7 wherein the injector nozzle and the injector throat are axially aligned along a common longitudinal centerline with the mixing chamber disposed intermediate the injector nozzle and the injector throat.

11. The system of claim 7 further comprising an electromechanical logic circuit configured to control the system including signaling the system to perform at least one of:
flushing the reverse osmosis membrane when permeate water demand is not present;
sequentially storing permeate water in a plurality of permeate water storage tanks;
minimizing sporadic feed water flows through the reverse osmosis membrane.

12. A high efficiency reverse osmosis system comprising:
a tuned injector in fluidic communication with a reverse osmosis membrane, the tuned injector comprising:
an injector housing to form feed water from a mixture of raw water and concentrate water in a defined mixing ratio;
a first inlet section in the injector housing having a first inlet passage to receive for receiving raw water supplied at an initial hydrostatic system pressure to pressure; an injector nozzle, the injector nozzle having a first cross sectional area, the injector nozzle to receive raw water from the first inlet at the initial hydrostatic system pressure and provide the raw water to a mixing chamber in fluid communication with a second inlet of the injector housing;
a second inlet in the injector housing to receive recirculated concentrate water generated by the reverse osmosis membrane into the mixing chamber, the recirculated concentrate water fed to the second inlet only by the initial hydrostatic system pressure, without the assistance of a pump or other pressure creating device;
an injector throat having a third cross sectional area approximately twice as large as the second cross sectional area of the injector nozzle, the injector throat bored, threaded or inserted into the injector housing, to receive the feed water from the mixing chamber and to discharge the feed water through an outlet directly to the reverse osmosis membrane without increasing feed water pressure between the tuned injector and the reverse osmosis membrane:
wherein the cross sectional areas are dimensions configured to provide the defined mixing ratio.

13. The system of claim 12 wherein the tuned injector is provided in an injector housing separate from the reverse osmosis membrane.

14. The system of claim 12 wherein the tuned injector is provided in an injector housing integral with the reverse osmosis membrane.

15. The system of claim 12 wherein the tuned injector is configured to maintain hydrostatic pressure applied on the reverse osmosis membrane within 15% of the initial hydrostatic system pressure.

16. The system of claim 12 further comprising an electromechanical logic circuit configured to control the system including signaling the system to perform at least one of:
flushing the reverse osmosis membrane when permeate water demand is not present;
sequentially storing permeate water in a plurality of permeate water storage tanks;
minimizing sporadic feed water flows through the reverse osmosis membrane.

17. The system of claim 12, wherein the defined mixing ratio is approximately 3 parts recirculated concentrate water to 2 parts raw water.

\* \* \* \* \*